United States Patent [19]
Tomita et al.

[11] Patent Number: 4,969,978
[45] Date of Patent: Nov. 13, 1990

[54] APPARATUS AND METHOD FOR TUNNEL CURRENT MEASUREMENT OBSERVED SIMULTANEOUSLY WITH ELECTROCHEMICAL MEASUREMENT

[75] Inventors: Eisuke Tomita; Toshihiko Sakuhara, both of Tokyo; Kingo Itaya, Sendai, all of Japan

[73] Assignee: Seiko Instruments Inc., Japan

[21] Appl. No.: 276,227

[22] Filed: Nov. 23, 1988

[30] Foreign Application Priority Data

Nov. 27, 1987 [JP] Japan .................. 62-299548

[51] Int. Cl.⁵ .................................. G01N 27/00
[52] U.S. Cl. .................. 204/153.1; 204/404; 204/153.11; 250/306; 250/307
[58] Field of Search ............... 250/306, 307; 204/1 C, 204/404

[56] References Cited

U.S. PATENT DOCUMENTS

| | | | |
|---|---|---|---|
| 2,857,320 | 10/1958 | Hughes | 204/1 T |
| 3,098,801 | 7/1963 | Marsh et al. | 204/1 T |
| 3,479,256 | 11/1969 | Smith et al. | 204/1 T |
| 4,668,865 | 5/1987 | Gimzewski et al. | 250/306 |

OTHER PUBLICATIONS

Richard Sonnenfeld et al., Science, Reports, vol II, pp. 211-213, Apr. 1986.
B. Drake et al., Rev. Sci. Instrum., 57(3), pp. 441-445, Mar. 1986.

*Primary Examiner*—G. L. Kaplan
*Attorney, Agent, or Firm*—Bruce L. Adams; Van C. Wilks

[57] ABSTRACT

Apparatus and method for tunnel current measurement observed simultaneously with electrochemical measurement using an electrochemical cell. The electrochemical cell holds a tip, a counter electrode, a reference electrode and a sample in a solution. In the electrochemical cell, a tunnel current flowing between a sample and the tip is detected while controlling the electrode potential of the sample in a solution for electrochemical measurement. The detected tunnel current is represented as the surface image of the sample during electrochemical reaction.

12 Claims, 6 Drawing Sheets

APPARATUS AND METHOD FOR TUNNEL CURRENT MEASUREMENT OBSERVED SIMULTANEOUSLY WITH ELECTROCHEMICAL MEASUREMENT

BACKGROUND OF THE INVENTION (1) Field of the Invention

The present invention relates to an apparatus and method for tunnel current measurement taken simultaneously with electrochemical measurement. More particularly, it relates to an apparatus and method for detecting the tunnel current flowing between a sample to be investigated and a tip while measuring the electrochemical reaction by regulating the electric potential of the sample in a solution. Furthermore, it relates to scanning tunneling microscopy for producing a surface image of the sample from the detected tunnel current during the electrochemical reaction.

(2) Description of the Related Art

A technique of detecting the current of a sample by regulating the electrode potential of the sample and observing an electrochemical reaction is generally adopted, and apparatuses for using the technique are commercially available, for example, as a potentiostat and a polarography. A method of detecting a tunnel current by applying a voltage between a sample and a tip is also generally used, and a means for producing the surface image of the sample from the detected tunnel current is known as a scanning tunneling microscope. Such a scanning tunneling microscope has already been known from, e.g., U.S. Pat. No. 4,343,993 and measurement under a super high vacuum is carried out by using one. Recently, measurement in air and in a solution has also been carried out.

However, a method of detecting a tunnel current simultaneously with the measurement of an electrochemical reaction, such as electrochemical deposition, corrosion of an electrode, various reactions of an electrode, etc. had not been established heretofore and had been considered impossible.

SUMMARY OF THE INVENTION

It is a primary object of the present invention to provide an apparatus and method for tunnel current measurement observed simultaneously with electrochemical measurement.

It is another object of the present invention to provide a scanning tunneling microscopy system for producing a surface image of a sample from the detected tunnel current during electrochemical measurement.

In accordance with the present invention there is provided an apparatus comprising an electrochemical cell holding therein a tip, a counter electrode, a reference electrode and a sample in a solution, a first control means for controlling an electric potential of the sample, a first detecting means for detecting the value of the current flowing between the sample and the counter electrode, positioning means for positioning the tip close to the sample surface so that tunneling current flows between the tip and the sample surface, a second control means for controlling an electrode potential difference between the tip and the sample, and a second detecting means for detecting the tunnel current flowing due to the potential difference between the tip and the sample.

DESCRIPTION OF THE PREFERRED EMBODIMENTS

The method according to the present invention method of comprises regulating the electrode potential of a sample for producing an electrochemical reaction, detecting the current flowing between the sample and a counter electrode, simultaneously regulating the electrode potential of a tip, and detecting the tunnel current flowing due to a difference in the electrode potential between the sample and the tip. At this time, if the electrode potential of the sample is scanned, the electrochemical reaction of the sample is determined from the detected tunnel current at each electrode potential. On the other hand, if the electrode potential of the sample is kept constant and the electrode potential of the tip is scanned while varying the potential difference between the sample and the tip, an identification of the deposited material, for example, on the surface of the sample, can be made. In addition, miniaturization and simplification of the measuring system can be attained by uniting a counter electrode and a reference electrode into one electrode.

An apparatus for carrying out the above-described method by the present invention includes an electrochemical cell holding a tip, a counter electrode, a reference electrode and a sample in a solution, a first control means for controlling an electric potential of the sample, a first detecting means for detecting the value of the current flowing between the sample and the counter electrode, positioning means for positioning the tip close to the sample surface so that tunneling current flows between the tip and the sample surface, a second control means for controlling an electrode potential difference between the tip and the sample, and a second detecting means for detecting the tunnel current flowing due to the potential difference between the tip and the sample.

In the apparatus, the first and second control means may include means for scanning the electrode potential of the sample and means for scanning the electrode potential of the tip, respectively.

Furthermore, the apparatus may also include a scanning tunneling microscopy system for producing an image of the surface of the sample during electrochemical reaction by keeping the potential difference between the sample and the tip constant, scanning the surface of the sample with the tip in the X-Y direction of X-Y, while using a Z-axis controller for controlling the distance between the tip and the sample so that the detected tunnel current is approximately constant, thereby three-dimensionally representing the position of the tip.

In the present invention, an electrochemical cell is formed by placing a sample, a counter electrode, a reference electrode and a tip in a solution, and the electrochemical measurement is carried out by a three electrode system using the sample, the counter electrode and the reference electrode. Simultaneously, the electrode potential of the tip is regulated by the tip, the counter electrode and the reference electrode, and the tunnel current produced by the potential difference between the sample and the tip is detected, thereby enabling tunnel current measurement simultaneous with electrochemical measurement. In addition, by inputting the detected tunnel current into a scanning tunneling microscope as a signal, scanning tunneling microscopy during electrochemical measurement can be carried out.

The behavior of a sample electrode in a solution is very important in electrochemistry, and such is of considerable importance in the electrolytic industry, anti-corrosion and surface treatment techniques, plating industry, and semiconductor industry. Most electrochemical reactions take place on the interface between an electrode and a solution, and the structure of the electrode surface holds the key. It is therefore important for elucidating electrochemical reactions such as an electrochemical deposition process, a corrosion process of an electrode and various reaction processes of an electrode to observe the structure of the electrode surface on an atomic level.

The present invention provides an apparatus and method for observing the structure of an electrode surface on an atomic level under the regulation of the electrode potential.

A description of the overall operation of the present invention will be described hereinunder. Firstly, the present invention enables the electrode potential of a sample to be fixed to measure a tunnel current. As a result, the reaction of the electrode taking place at the electrode potential of the sample is capable of being analyzed from a change in the tunnel current, so that by scanning the surface of the sample while keeping the tunnel current constant, the change in the structure of the surface of the sample can be analyzed. A conventional scanning tunneling microscope is only used to observe the surface of a sample in a solution, but the detection of a tunnel current under the regulation of the electrode potential of a sample enables the elucidation of the nature of electrode reactions.

Secondly, when the electrode potential of the sample is scanned and the potential difference between the sample and the tip is kept constant, the operation is as follows. The process of electrode reactions is generally analyzed from the potential-current curve (cyclic voltammogram). The use of the method and the apparatus of the present invention enables the tunnel current at each potential of the cyclic voltammogram to be measured and the structure of the surface of the sample at each potential to be obtained, thereby enabling the analysis of the electrochemical reaction in correspondence with the structure of the electrode surface.

Finally, when the electrode potential of the tip is scanned while making the electrode potential of the sample constant, STS (scanning tunnel spectroscopy) which is known in scanning tunneling microscopy is carried out under the regulation of the electrode potential of the sample, and the measurement of the work function of the surface of the sample, the identification of the material on the surface of the sample, and the measurement of the adsorbed atoms, the absorbed molecules, etc. as well as the atoms on the surface of the sample can be performed.

Preferred embodiments of the present invention will now be described with reference to the accompanying drawings.

(EMBODIMENT 1)

Figure 1:
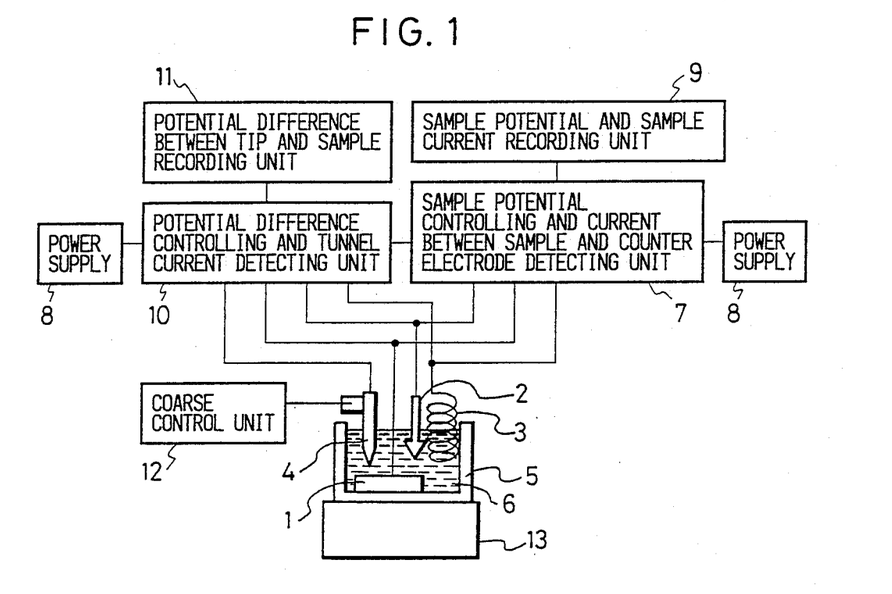
FIG. 1 is a schematic view of an apparatus for performing a method for tunnel current measurement taken simultaneously with electrochemical measurement according to the present invention.

FIG. 1 is a schematic view of an apparatus for tunnel current measurement taken simultaneously with electrochemical measurement. An electrochemical cell is formed by placing a sample 1, a reference electrode 2, a counter electrode 3 and a tip 4 in a container 5 filled with a solution 6. As the sample 1, a conductive material, a conductive material covered with a modified electrode and the like are usable. The reference electrode 2 is one generally used in electrochemistry and is represented by an SCE and a silver-silver halide electrode. The material for the tip 4 may be various materials generally used in scanning tunneling microscopy, and is represented by platinum and tungsten. However, the tip in the present invention must minimize the current which flows due to electrochemical reaction, thereby concentrating the current mainly as tunnel current. For this purpose, the tip is covered with an insulating material except for the very minute tip portion. A method of producing the tip 4 will be described in detail in Embodiment 2. The electrochemical cell is placed on an antivibrator stand 13 in order to prevent a variation in the distance between the tip 4 and the sample 1 caused by factors, external factor such as vibration. The sample 1, the reference electrode 2 and the counter electrode 3 are connected to a sample potential controlling and current between the sample and counter electrode detecting unit 7. The apparatus uses a voltage supplied from a power supply 8 to set the electrode potential of the sample 1 for electrochemical measurement. The sample potential controlling and sample current detecting portion 7 is connected to a sample potential and sample current recording unit 9 for recording the electrochemical measurement of, e.g., a potential-current curve. The tip 4, the sample 1, the reference electrode 2 and the counter electrode 3 are connected to a potential difference controlling and tunnel current detecting unit 10. The apparatus uses a voltage supplied from the power supply 8 and sets a potential difference between the tip 4 and the sample 1 and detects a tunnel current in a circuit in which the potential difference controlling and tunnel current detecting unit 10 is also connected to the sample potential controlling and sample current detecting unit 7. The circuitry structure of the sample potential controlling and current between the sample and counter electrode detecting unit 7 and the potential difference controlling and tunnel current detecting unit 10 connected thereto is an important factor of the present invention. This will be described in detail in Embodiments 3 and 4. The potential difference controlling and tunnel current detecting unit 10 is connected to a potential difference recording unit 11 for recording the potential difference between the tip 4 and the sample 1. A coarse adjustment mechanism 12 is used as a means for moving the tip 4 to a position at a distance from the sample 1 which allows a tunnel current to flow therebetween. A micrometer is generally used as the coarse adjustment mechanism 12.

(EMBODIMENT 2)

Figures 2A, 2B, 2C:
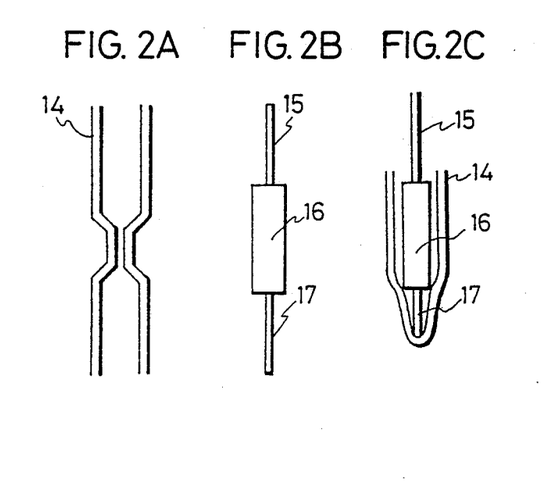
FIGS. 2A to 2D are explanatory views showing a method of producing a tip used in the present invention.
Figure 2D:
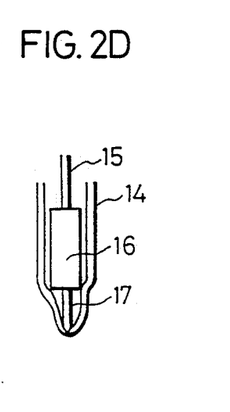

A method of producing a tip used in the method and apparatus of the present invention will be explained hereinunder. As described in Embodiment 1, the material for tip 4 may be various materials generally used in scanning tunneling microscopy, and is represented by platinum and tungsten. However, the tip in the present invention must minimize the current which flows due to electrochemical reactions, thereby concentrating the current mainly as tunnel current. For this purpose, the tip is covered with an insulating material except for the very minute tip portion. As an example, a method of producing a tip by using platinum is shown in FIG. 2.

(1) A glass capillary tube 14 having an inner diameter of about 1 mm is heated to form a narrow portion. (2) A Cu wire 15 and a W wire 16 are next spot welded to each other. Further, a Pt wire 17 having a diameter of about 50 μm is welded to the W wire 16. (3) The product obtained at the step (2) is inserted into the glass capillary tube 14 obtained at the step (1), thereby sealing the narrow portion with heat. (4) The tip portion of the capillary tube 14 is ground so as to expose the very minute platinum. When the thus-produced tip was used in a 0.05 M sulfuric acid solution to observe a tunnel current of 4 nA, which is the typical tunnel current value, the background current flowing on the tip due to the electrochemical reaction with the solution was about 0.2 nA, which was about 5% of the tunnel current value, in other words, negligibly small.

(EMBODIMENT 3)

Figure 3A:
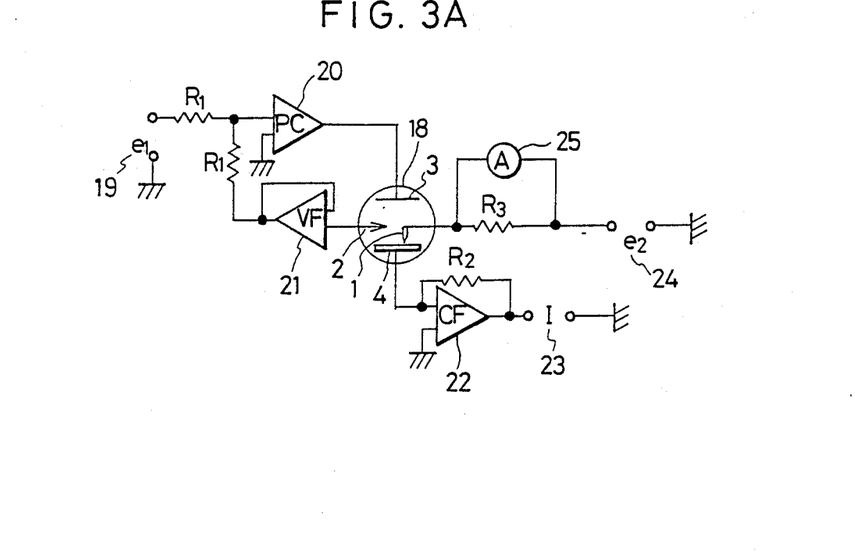
FIGS. 3A to 3C are circuit diagrams of circuits for setting the potential of a sample, setting the potential of a tip and measuring a tunnel current, respectively.
Figure 3B:
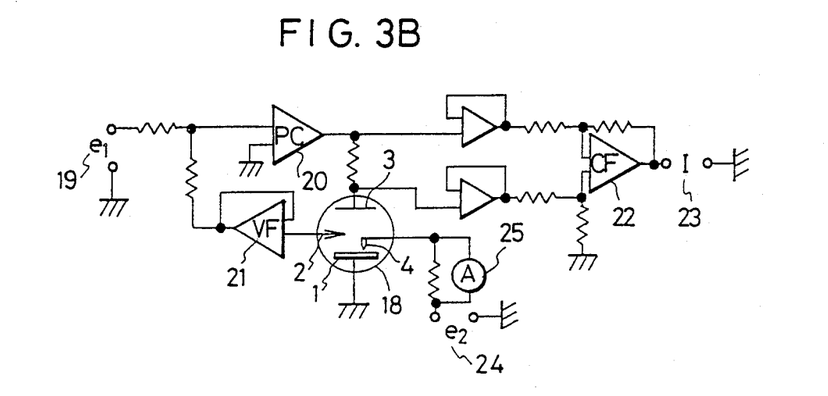
Figure 3C:
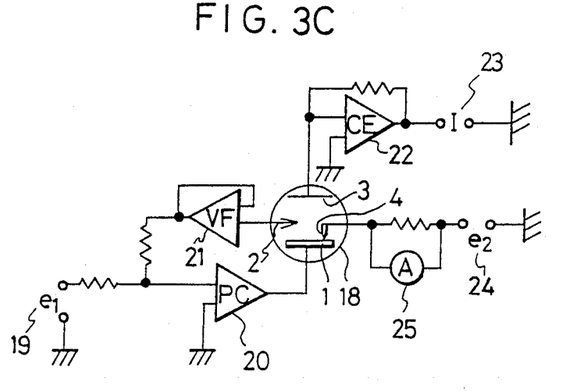

The circuitry structure, which is an important feature of the present invention, will here be described. FIGS. 3A to 3C show typical circuits for setting the potential of a sample, setting the potential of a tip and measuring a tunnel current, respectively, by using four electrodes comprised of the sample 1, the reference electrode 2, the counter electrode 3 and the tip 4. This circuitry structure will be explained in detail with reference to FIG. 3B. In an electrochemical cell 18 composed of the four electrodes of the sample 1, the reference electrode 2, the counter electrode 3 and the tip 4, the voltage value $e_1$ applied by a voltage input $E_1$ 19 is supplied to a voltage follower 21 and a potentiostat 20, thereby setting the electrode potential of the sample 1 at $e_1$ with respect to the reference electrode 2.

The current flowing in the sample 1 due to the electrochemical reaction taking place at this electrode potential is detected from a sample current output 23 through a current follower 22. Consequently, inputting the values of the voltage input $E_1$ 19 and the sample current output 23 in a recording portion enables the electrochemical measurement of, e.g., the potential-current curve of the sample 1. To the tip 4, a voltage $e_2$ is applied by a voltage input $E_2$ 24, and the electrode voltage of the tip 4 is set at $e_1 + e_2$ with respect to the reference electrode 2. The tunnel current flowing between the tip 4 and the sample 1 due to the potential difference $e_2$ between the tip ($e_1 + e_2$) and the sample ($e_1$) is measured from a tunnel current output 25. Consequently, by inputting the values of the voltage input $E_1$ 24 and the tunnel current output 25 in a recording portion, the potential difference between the tip 4 and the sample 1 is measured. The above is an example of a circuit for tunnel current measurement observed simultaneously with electrochemical measurement. In this case, if a function generator is used as the voltage input $E_1$ 19, the scanning of the electrode potential of the sample 1 can be carried out. On the other hand, if a function generator is used as the current output $E_2$ 24, it is easy to vary the potential difference between the sample 1 and the tip 4.

(EMBODIMENT 4)

Figure 4:
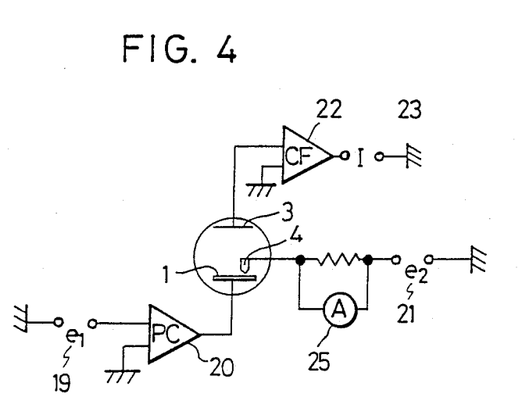
FIG. 4 shows an example of the circuitry structure in the case of using three electrodes of a sample, a tip and a counter electrode.

In this embodiment, as shown in FIG. 4, the reference electrode 2 and the counter electrode 3 are united into one electrode 3. In an apparatus for tunnel current measurement taken simultaneously with electrochemical measurement, it is necessary that the electrochemical cell is be miniaturized and simplified as much as possible. For this purpose, the number of the electrodes is preferably made as small as possible. The sample 1, the tip 4 and the counter electrode 3 are essential in a method and an apparatus of the present invention. However, if the reference electrode 3 is omitted, the setting of an electrode voltage, which is based on the reference electrode in electrochemical measurement, becomes difficult. To solve this problem, the reference electrode 2 and the counter electrode 3 are united into one body (hereinunder referred to as "counter electrode" in this embodiment). The conditions for the counter electrode are that it shows a reversible potential which is stable for a long time, that the potential is changed to a negligibly small extent by the current flowing between the sample and the counter electrode during electrochemical measurement, and that even when a minute amount of current flows on the counter electrode and the potential is changed, the potential is immediately restored to the original potential without exhibiting hysteresis. In this embodiment, the following two electrodes were used as those satisfying the above conditions. One was a silver electrode used when silver ions existed in the solution. The electrode became a silver-silver ion electrode and was stably driven. The other was a silver wire used when the solution contained halogen ions. The silver wire became a silver-halogen electrode and was stably driven. Other electrodes satisfying the above conditions are also usable as the counter electrode.

(EMBODIMENT 5)

A circuitry structure using three electrodes of the sample 1, the tip 4 and the counter electrode 3 (serving also as the reference electrode as in Embodiment 4) will be shown. This circuitry structure is fundamentally realized by short-circuiting the counter electrode 3 and the reference electrode 2 in the circuitry structure shown in FIGS. 3A and 3B. FIG. 4 shows another example of such a circuit. This circuit is simplified in comparison with the circuits shown in FIG. 3. That is, the voltage follower is removed in this embodiment. When the potential of the counter electrode 3 (serving also as the reference electrode) is stable, the electrode potential of the sample 1 is set at $e_1$ with respect to the counter electrode 3, and the electrode potential of the tip 4 is set at $e_2$ with respect to the counter electrode. As a result, the potential difference between the tip 4 and the sample 1 becomes $e_2 - e_1$, and the tunnel current corresponding to the potential difference is detected.

(EMBODIMENT 6)

Figure 5:
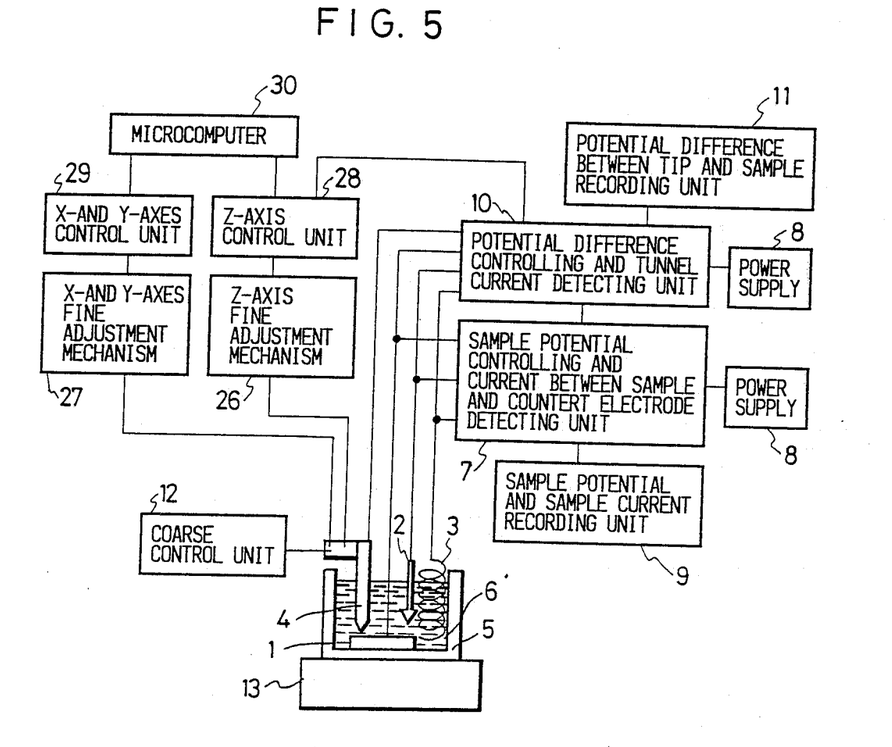
FIG. 5 shows the structure of a scanning tunneling microscopy apparatus during electrochemical measurement.

FIG. 5 shows the structure of a scanning tunneling microscopy system during electrochemical measurement by a method for tunnel current measurement observed simultaneously with electrochemical measurement shown in FIG. 1. In Embodiment 1, the steps from the beginning to the step of tunnel current measurement are described. In this embodiment, the subsequent steps will be explained. The tip 4 is brought close to the sample 1 at a distance which allows a tunnel current to flow therebetween by the coarse adjustment mechanism 12. The tip 4 is also connected to a Z-axis fine adjustment mechanism 26 and an X-and Y-axes fine adjustment mechanism 27. These fine adjustment mechanisms 26 and 27 are generally composed of piezoelectric elements so that the tip 4 may be moved by the application of a voltage. The distance for movement can be represented as a function of a voltage. Therefore, the Z-axis fine adjustment mechanism 26 is connected to a Z-axis controller or control unit 28 for controlling a voltage, and the X-and Y-axes fine adjustment mechanism 27 is connected to a X-and Y-axes controller or control unit 29 for controlling a voltage. The Z-axis controller 28 adjusts a voltage being applied to the Z-axis fine adjustment mechanism 26 so that the tunnel current detected by the potential difference controlling and tunnel current detecting portion 10 is constant, whereby the Z-axis fine adjustment mechanism 26 controls the distance which the tip 4 moves. On the other hand, control of the voltage value of the X-and Y-axes controller 29 enables the tip 4 to scan the surface of the sample 1 in a plane by means of the X-and Y-axes fine adjustment mechanism. A microcomputer 30 processes the voltages applied by the X-and Y-axes controller 29 and the Z-axis controller 28 so as to represent them as the three-dimensional position of the tip 4, thereby representing a topological surface image of the sample 1.

As described above, according to the scanning tunneling microscopy of the present invention, it is possible to fix the electrode potential of the sample and form the surface image of the sample, and when the electrode potential of the sample is scanned, the surface image of the sample can be formed simultaneously with the electrochemical measurement of the sample.

(EMBODIMENT 7)

Figure 6:
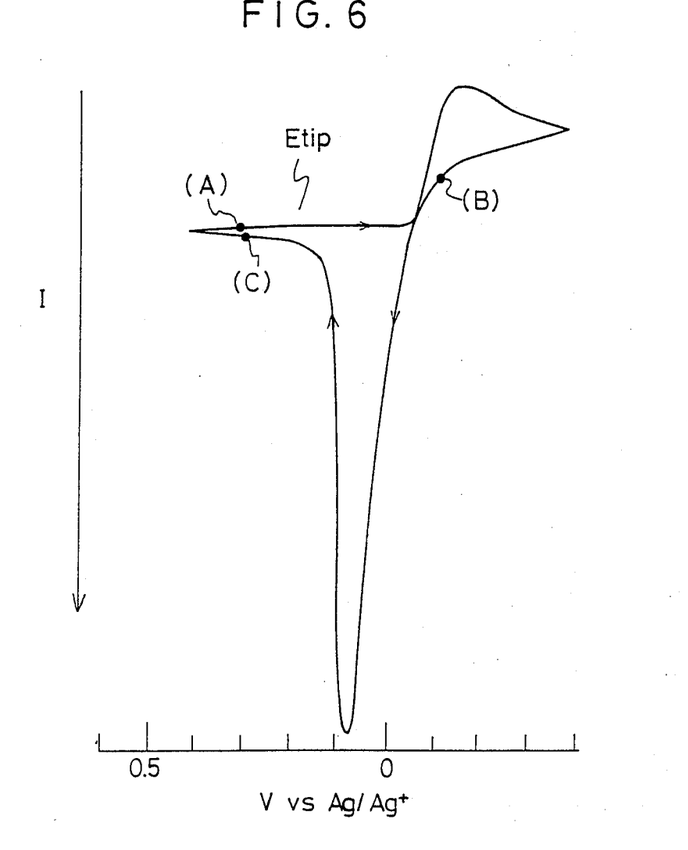
FIG. 6 is a cyclic voltammogram obtained by using the apparatus shown in FIG. 5 (using the circuitry shown in FIG. 4)
Figure 7A:
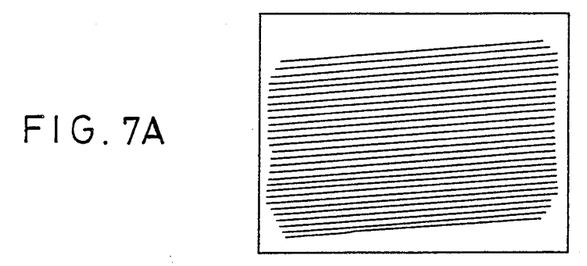
FIGS. 7A to 7C are explanatory views of the surface images of the sample measured at each potential of the cyclic voltammogram of FIG. 6.
Figure 7B:
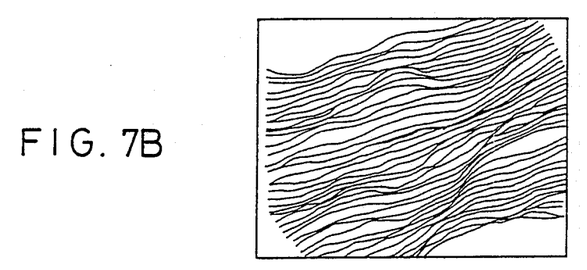
Figure 7C:
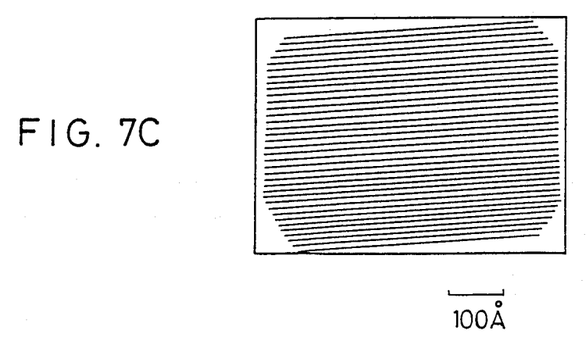

Actual measurement was taken by using the apparatus of the present invention. As the sample, HOPG (high order pyrolytic graphite) was used and a coiled silver wire was used as the counter electrode serving also as the reference electrode. The tip shown in Embodiment 2 was used as the tip. A solution of silver perchloride was charged in the container, and the sample HOPG, the silver wire as the counter electrode and the tip were placed in the solution to constitute an electrochemical cell. In this case, silver ions existed in the solution, and the silver wire acted as a silver-silver ion electrode, thereby functioning as the counter electrode and serving also as the reference electrode. The electrochemical cell and the scanning tunneling microscopy during electrochemical measurement shown in FIG. 6 were used for tunnel current measurement taken simultaneously with electrochemical measurement, and the formation of the surface image of the sample. The circuitry used for tunnel current measurement taken simultaneously with electrochemical measurement is the circuitry of Embodiment 5 shown in FIG. 4. The results are shown in FIGS. 6 and 7. The electrode potential of HOPG was first fixed at 0.3 V with respect to the counter electrode silver-silver ion electrode. The electrode potential of the tip was also fixed at 0.23 Vvs Ag/Ag+ and the surface of the sample was scanned by the tip. The surface image of the sample formed is shown in FIG. 7A. At this potential of the sample, the image on the surface of HOPG was formed without causing deposition of silver. Then, the potential of the sample was scanned in the negative direction to measure the potential-current curve shown in FIG. 6. In the vicinity of $-0.05$ Vvs Ag/Ag+, a negative current flows and silver begins to be separated. In the vicinity of 0.35 Vvs Ag/Ag+, the potential was restored and fixed in the vicinity of 0.10 Vvs Ag/Ag+ (the point (B) in FIG. 6). At this potential, the tip was scanned. The surface image of the sample obtained is shown in FIG. 7B. Unlike the surface image of HOPG shown in FIG. 7A, the image with silver deposited on HOPG was observed. When the potential of the sample was further scanned in the positive direction (FIG. 6), a positive current flows and the deposited silver begins to be dissolved. At the potential (the point (C) in FIG. 6) at which the current value decreased, the potential was fixed, and the tip was scanned to form the surface image of HOPG shown in FIG. 7C. In agreement with the cyclic voltammogram shown in FIG. 6, the surface image of HOPG was obtained and solution of silver was confirmed. As described in this embodiment, the use of the apparatus of the present invention enables a tunnel current to be measured simultaneously with electrochemical measurement and the surface image of the sample to be formed by using the detected tunnel current.

The present invention enables a tunnel current to be measured simultaneously with electrochemical measurement, and the detected tunnel current to be represented as the surface image of the sample by scanning the surface of the sample such that the detected tunnel current is constant. The use of the apparatus of the present invention enables an electrochemical reaction to be analyzed in combination with the structure of the electrode surface. Thus, the present invention advantageously provides an apparatus which is important for the electrolytic industry, anticorrosion and surface treatment techniques, plating industry, and semiconductor industry.

What is claimed is:

1. An apparatus for effecting tunnel current measurement of a sample within a solution simultaneously with electrochemical measurement thereof, comprising:
   an electrochemical cell holding a tip, a counter electrode and a reference electrode in a solution;
   first control means for controlling an electrochemical potential of a sample immersed in the solution with respect to the reference electrode to regulate an electrochemical reaction on a surface of the sample;
   first detecting means for detecting the value of electrochemical current flowing between the sample and the counter electrode;
   positioning means for positioning the tip close to the sample surface so that tunnel current flows between the tip and the sample surface;
   second control means for controlling an electrochemical potential of the tip with respect to the reference electrode to set a potential difference between the tip and the sample effective to flow substantially only tunnel current between the tip and the sample; and second detecting means for detecting the tunnel current flowing due to the potential difference between the tip and the sample.

2. An apparatus as claimed in claim 1; wherein the first control means includes means for scanning the electrochemical potential of the sample.

3. An apparatus as claimed in claim 1; wherein the second control means includes means for scanning the electrochemical potential of the tip.

4. An apparatus as claimed in claim 1; wherein the counter electrode and the reference electrode are united into one electrode.

5. An apparatus for effecting tunneling current measurement of a sample in a solution simultaneously with electrochemical measurement thereof, comprising:

an electrochemical cell holding a tip, a counter electrode and a reference electrode in a solution;

first control means for controlling an electrochemical potential of a sample immersed in the solution with respect to the reference electrode to regulate an electrochemical reaction on a surface of the sample;

first detecting means for detecting the value of electrochemical current flowing between the sample and the counter electrode;

positioning means for positioning the tip close to the sample surface so that tunnel current flows between the tip and the sample surface;

second control means for controlling an electrochemical potential of the tip with respect to the reference electrode to set a potential difference between the tip and the sample effective to flow substantially only tunnel current between the tip and the sample;

second detecting means for detecting the tunnel current flowing due to the potential difference between the tip and the sample;

third control means for controlling the distance between the tip and the sample surface so that the detected tunnel current is maintained substantially constant, the third control means controlling a Z-axis fine adjustment mechanism which drives the tip in a Z direction;

fourth control means for controlling the scanning of the tip over the sample surface, the fourth control means controlling an X-axis and Y-axis fine adjustment mechanism which drives the tip in X and Y directions which are both perpendicular to the Z direction; and means for graphically displaying the spatial coordinates of the scanning tip to produce a topological image of the sample surface.

6. An apparatus as claimed in claim 5; wherein the first control means includes means for scanning the electrochemical potential of the sample.

7. An apparatus as claimed in claim 5; wherein the second control means includes means for scanning the electrochemical potential of the tip.

8. An apparatus as claimed in claim 5; wherein the counter electrode and the reference electrode are united into one electrode.

9. A method for effecting tunnel current measurement of a sample within a solution simultaneously with electrochemical measurement thereof using an electrochemical cell which has a counter electrode, a reference electrode and a tip in a solution, comprising the steps of:

(a) setting the electrochemical potential of the sample with respect to the reference electrode to effect electrochemical reaction of the sample;

(b) detecting the value of electrochemical current flowing between the sample and the counter electrode;

(c) positioning the tip close to the sample surface so that tunnel current flows between the tip and the sample surface;

(d) setting the electrochemical potential of the tip with respect to the reference electrode so as to cause substantially only tunnel current to flow between the tip and the sample; and (e) detecting the tunnel current flowing due to the potential difference between the tip and the sample.

10. A method as claimed in claim 9; wherein the tunnel current measurement is carried out while maintaining constant the sample electrode potential.

11. A method as claimed in claim 9; wherein the tunnel current measurement is carried out while maintaining constant the potential between the sample and tip while scanning the sample potential.

12. A method as claimed in claim 9; wherein the tunnel current measurement is carried out while maintaining constant the sample electrode potential while scanning the tip electrode.

* * * * *